March 8, 1966     S. WALKER     3,239,033
DISC BRAKES
Filed Aug. 17, 1964     2 Sheets-Sheet 1
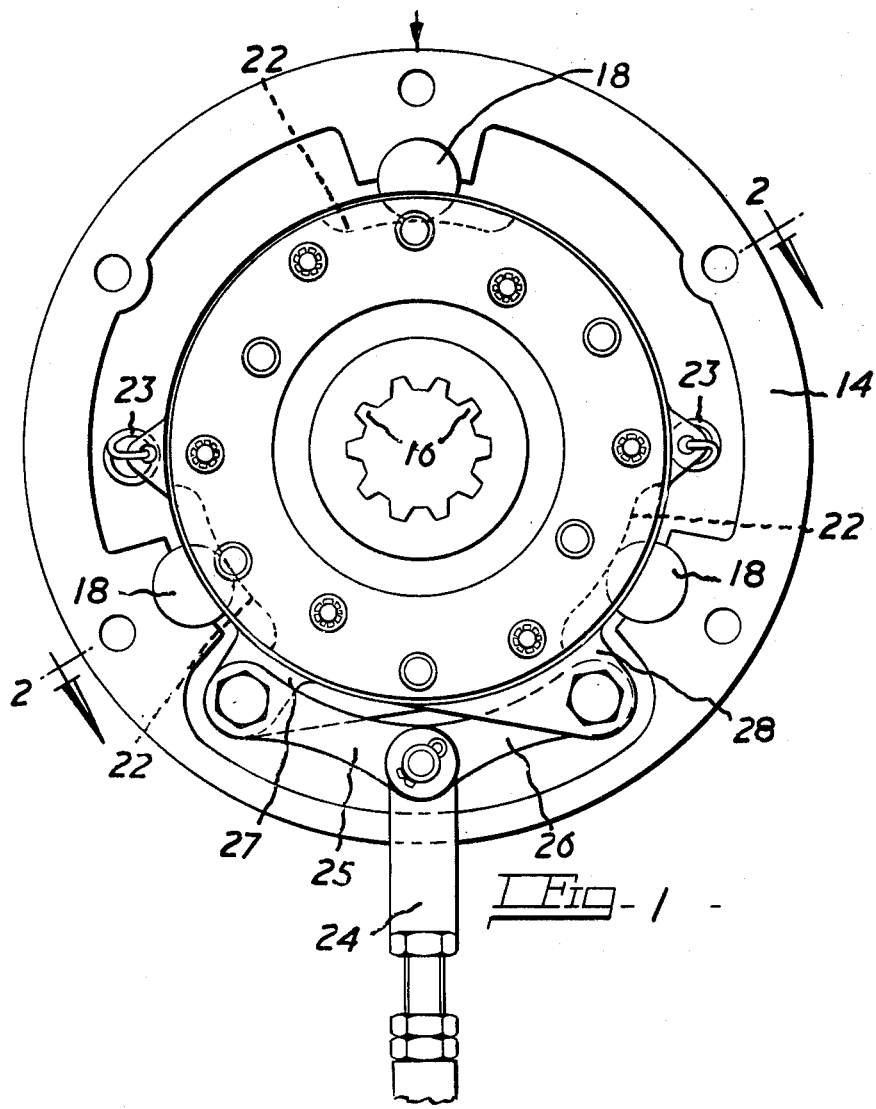
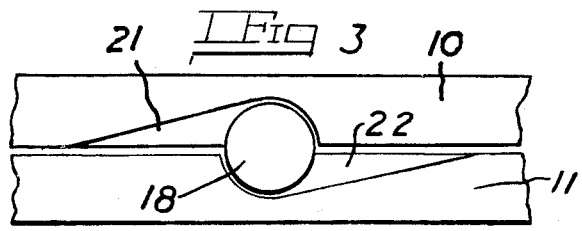

March 8, 1966

S. WALKER 3,239,033

DISC BRAKES

Filed Aug. 17, 1964

United States Patent Office 3,239,033
Patented Mar. 8, 1966

3,239,033
DISC BRAKES
Stanley Walker, Birmingham, England, assignor to Girling Limited, Birmingham, England, a British company
Filed Aug. 17, 1964, Ser. No. 390,778
Claims priority, application Great Britain, Aug. 16, 1963, 32,453/63
4 Claims. (Cl. 188—72)

This invention relates to improvements in disc brakes of the kind in which relatively stationary and rotatable surfaces are brought into frictional engagement by axial separation of a pair of co-operating pressure plates between which are arranged balls working in complementary inclined ramps in the adjacent surfaces of the plates. The application of the brake is initiated by moving one or each pressure plate angularly relative to the other to bring the friction surfaces into engagement, the pressure plates then being carried around with the rotating member or members until one of the plates is arrested by the engagement of a lug on the plate with a stop abutment on the housing, the application of the brake being completed by continued angular movement of the other plate.

One disadvantage of this arrangement is that the axial movement of the first plate is restricted by the high frictional resistance to sliding of the lug on the stop abutment under load. This results in a non-uniform distribution of the braking force, the remainder of the disc applying a greater force, and the brake is liable to develop noise and chatter.

According to my invention, in a disc brake of the kind set forth the balls are loacted in axial grooves of substantially semi-circular cross-section formed in the inner surface of the housing which is substantially concentric with the pressure plates so that the balls are constrained against movement except in a direction parallel to the axis of the brake, and the balls engage in and co-operate with oppositely inclined pockets of arcuate cross-section in the faces of the plates at their peripheral edges, the pockets being of progressively varying depth in an axial direction and being located on a pitch circle of constant diameter.

One form of brake in accordance with my invention is illustrated by way of example in the accompanying drawings in which:

FIGURE 1 is an end view of the brake with the cover of the housing and one brake disc removed;

FIGURE 3 is a fragmentary view of a portion of the peripheries of the pressure plates and one of the balls looking in the direction of the arrow in FIGURE 1.

Figure 2:
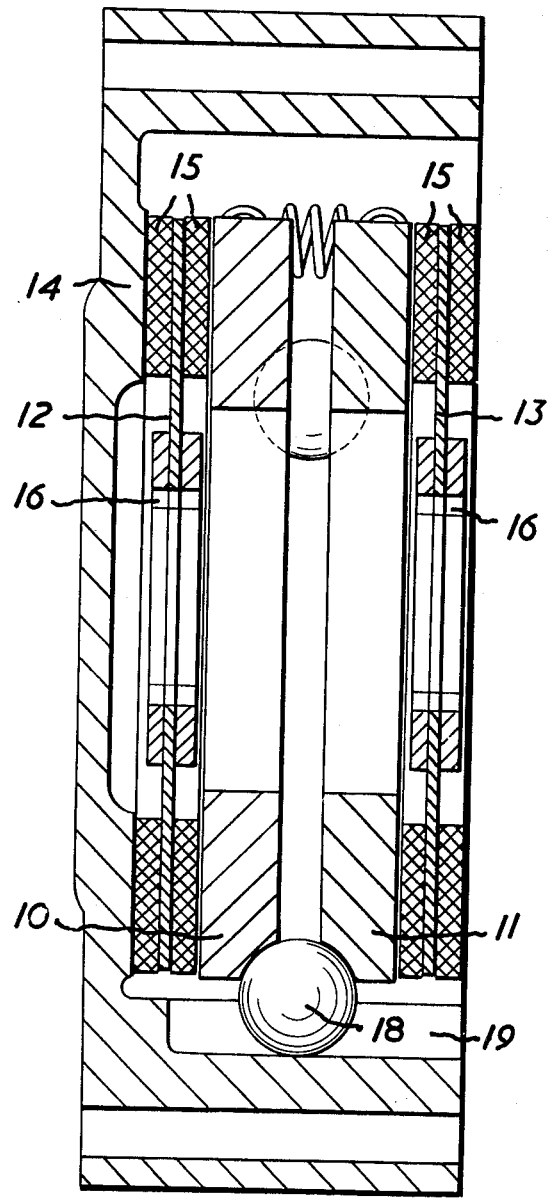
FIGURE 2 is a section on the line 2—2 of FIGURE 1.

In the brake illustrated two co-operating pressure plates 10, 11 are located between two rotatable discs 12, 13 within a stationary cylindrical housing 14. The discs which carry rings of friction material 15 on each face are slidably mounted by means of splines 16 on a rotatable shaft (not shown). When the pressure plates are urged apart they engage the discs which are frictionally gripped between the pressure plates and machined surfaces on the end wall 17 of the housing and a complementary end cover (not shown) secured to the open end of the housing.

In the usual brake of this kind the pressure plates are urged apart by balls working in complementary inclined ramps in the adjacent surfaces of the plates.

According to my invention the pressure plates 10, 11 are urged apart by balls 18 located in angularly spaced axial grooves 19 of substantially semi-circular cross-section formed in the inner surface of the housing which is substantially concentric about the pressure plates.

The balls are constrained by the grooves against movement except in a direction parallel to the axis of the brake. Each ball engages in and co-operates with oppositely inclined pockets 21, 22 in the adjacent faces of the pressure plates at their peripheral edges, the pockets being of progressively varying depth in an axial direction and being located on a pitch circle of constant diameter. The pocket in one plate increases progressively in axial depth in one circumferential direction and the pocket in the other plate increases progressively in axial depth in the other direction as shown in FIGURE 3. The axially deeper end of each groove is of part-spherical form and of a radius substantially equal to that of a ball.

When the brake is applied and the pressure plates move angularly with the rotating discs the deeper ends of the pockets in one plate will come into engagement with the balls which arrest its movement while the angular movement of the other plate continues to provide the servo-action urging the plates apart, the balls moving axially in their grooves as required by axial movement of the plates.

The forces urging the plates apart are thus spread evenly around the plates as no part of a plate is subjected to a greater resistance to axial movement than other parts.

When the brake is released the pressure plates are drawn together by springs 23 which maintain a small clearance between the plates and the friction discs.

The application of the brake is initiated by moving the pressure plates angularly in opposite directions, and in the brake illustrated this is effected by means of a pull-rod 24 pivotally connected to divergent links 25, 26 of which the outer ends are pivotally connected to lugs 27, 28 on the respective plates.

Any other convenient means can be employed for this purpose, as for example a cam on an angularly movable shaft which is permitted a limited movement in a circumferential direction in the housing, the cam operating between complementary radial lugs on the pressure plates.

In the brake illustrated there are three angularly spaced balls but it will be appreciated that there may be four or more.

I claim:
1. A disc brake comprising a stationary housing, a rotatable shaft within said housing, a pair of axially spaced discs slidably mounted for limited axial movement on said shaft, annular braking surfaces on opposite sides of each disc, axially spaced radial surfaces in said housing, an inner surface in said housing, axially separable pressure plates substantially concentric with said inner surface of said housing and located between the discs for bringing the discs into frictional engagement with the radial surfaces in said housing, each pressure plate having an outer peripheral edge, angularly spaced axial grooves of substantially semi-circular cross-section formed in the inner surface of the housing, oppositely inclined pockets of arcuate cross-section in adjacent faces of the pressure plates at their peripheral edges, the pockets being of progressively varying depth in an axial direction and being located on a pitch circle of constant diameter, and balls located in said axial grooves in the inner surface of said housing and engaging and co-operating with said oppositely inclined pockets in said pressure plates, whereby the balls are constrained against movement except in a direction parallel to the axis of the brake and the balls co-operate with said inclined pockets to effect separation of said pressure plates when relative angular movement between the pressure plates takes place.

2. A disc brake as claimed in claim 1, wherein said pocket in one of said pressure plates increases progressively in axial depth in a first circumferential direction from a first end to a deep end, and said pocket in said other of said pressure plates increases progressively in axial depth in a second circumferential direction opposite to said first circumferential direction from a first end to a deep end.

3. A disc brake as claimed in claim 2, wherein said deep end of each pocket is of part spherical form and of a radius substantially equal to that of a ball.

4. A disc brake comprising a housing, a rotatable shaft within said housing, at least one disc slidably mounted for limited axial movement on said shaft, annular braking surfaces on opposite sides of said disc, at least one radial surface in said housing, an inner surface in said housing, at least one axially movable pressure plate substantially concentric with said inner surface of said housing for bringing said disc into engagement with said radial surface in said housing, said pressure plate having an outer peripheral edge, angularly spaced axial grooves of substantially semi-circular cross-section formed in the inner surface of said housing, inclined pockets of arcuate cross-section in the face of said pressure plate remote from said disc at the peripheral edge of said disc, the pockets being of progressively varying depth in an axial direction and being located on a pitch circle of constant diameter, and means located in said axial grooves in the inner surface of said housing and co-operating with said inclined pockets and with a part of said brake adjacent to the face of said pressure plate remote from said disc, whereby said means co-operate with said pockets to effect relative axial movement between said pressure plate and said brake part when relative angular movement between said pressure plate and said brake part takes place.

References Cited by the Examiner
UNITED STATES PATENTS
2,091,269   8/1937   Colman _____ 192—93

FOREIGN PATENTS
982,138   1/1951   France.

MILTON BUCHLER, Primary Examiner.
G. E. A. HALVOSA, Assistant Examiner.